United States Patent
Zalud

(10) Patent No.: US 11,442,153 B2
(45) Date of Patent: Sep. 13, 2022

(54) SYSTOLIC PROCESSOR SYSTEM FOR A LIGHT RANGING SYSTEM

(71) Applicant: SRI International, Menlo Park, CA (US)

(72) Inventor: Peter Ferdinand Zalud, New Hope, PA (US)

(73) Assignee: SRI International, Menlo Park, CA (US)

(*) Notice: Subject to any disclaimer, the term of this patent is extended or adjusted under 35 U.S.C. 154(b) by 579 days.

(21) Appl. No.: 16/488,918

(22) PCT Filed: Feb. 20, 2018

(86) PCT No.: PCT/US2018/018843
§ 371 (c)(1),
(2) Date: Aug. 26, 2019

(87) PCT Pub. No.: WO2018/160395
PCT Pub. Date: Sep. 7, 2018

(65) Prior Publication Data
US 2020/0003876 A1    Jan. 2, 2020

Related U.S. Application Data

(60) Provisional application No. 62/465,040, filed on Feb. 28, 2017.

(51) Int. Cl.
G01S 7/481     (2006.01)
G01S 7/4863    (2020.01)
(Continued)

(52) U.S. Cl.
CPC ............ *G01S 7/4863* (2013.01); *G01L 1/241* (2013.01); *G01S 7/4816* (2013.01); *G01S 17/10* (2013.01); *G01S 17/89* (2013.01)

(58) Field of Classification Search
None
See application file for complete search history.

(56) References Cited

U.S. PATENT DOCUMENTS

2004/0135992 A1   7/2004  Munro
2004/0156546 A1   8/2004  Kloth
(Continued)

OTHER PUBLICATIONS

International Search Report and Written Opinion, PCT/US2017/037369, ISA:US, dated Dec. 27, 2018, 9 pp.

*Primary Examiner* — Eileen M Adams
(74) *Attorney, Agent, or Firm* — Rutan & Tucker, LLP

(57) ABSTRACT

A ROIC can perform systolic processing of light detectors. The ROIC performs the systolic processing of the light detectors to capture at least i) when, in time units, an initial photon of its reflected light pulse is captured by each of the light detectors in the array, ii) where geographically in terms of column and row address of the light detector capturing its photon is located in the array, iii) scan out data captured by the light detectors on the when in time units, and the where geographically that the photon was captured in a given light detector in the array, and then iv) analyze the data on the when and the where with an algorithm to know exactly when exactly, in terms of time units, the photon was captured relative to the input from the clock circuit in order to determine an objects characteristics.

20 Claims, 12 Drawing Sheets

(51) Int. Cl.
  *G01L 1/24* (2006.01)
  *G01S 17/10* (2020.01)
  *G01S 17/89* (2020.01)

(56) References Cited

U.S. PATENT DOCUMENTS

| | | |
|---|---|---|
| 2012/0261516 A1 | 10/2012 | Gilliland et al. |
| 2014/0212853 A1 | 7/2014 | Divakaran et al. |
| 2014/0212854 A1 | 7/2014 | Divakaran et al. |
| 2014/0347475 A1 | 11/2014 | Divakaran et al. |
| 2016/0003946 A1* | 1/2016 | Gilliland ............... G01S 7/4816 356/5.01 |
| 2016/0071024 A1 | 3/2016 | Amer et al. |
| 2016/0154882 A1 | 6/2016 | Cheng et al. |
| 2016/0266242 A1 | 9/2016 | Gilliland et al. |
| 2016/0306032 A1* | 10/2016 | Schwarz ................. G01S 7/497 |
| 2017/0160813 A1 | 6/2017 | Divakaran et al. |

\* cited by examiner

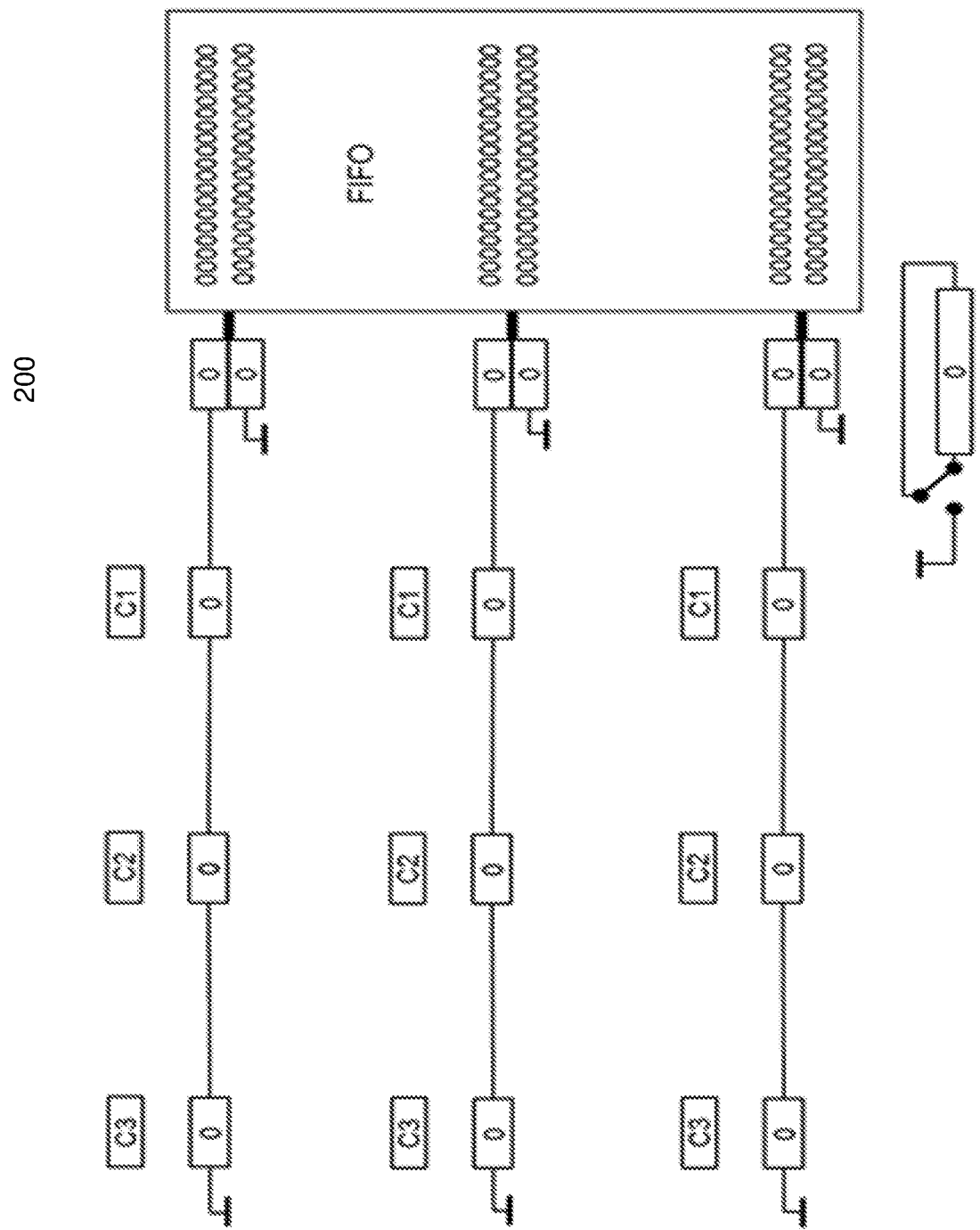
Figure 2a – Systolic Processing, time 0

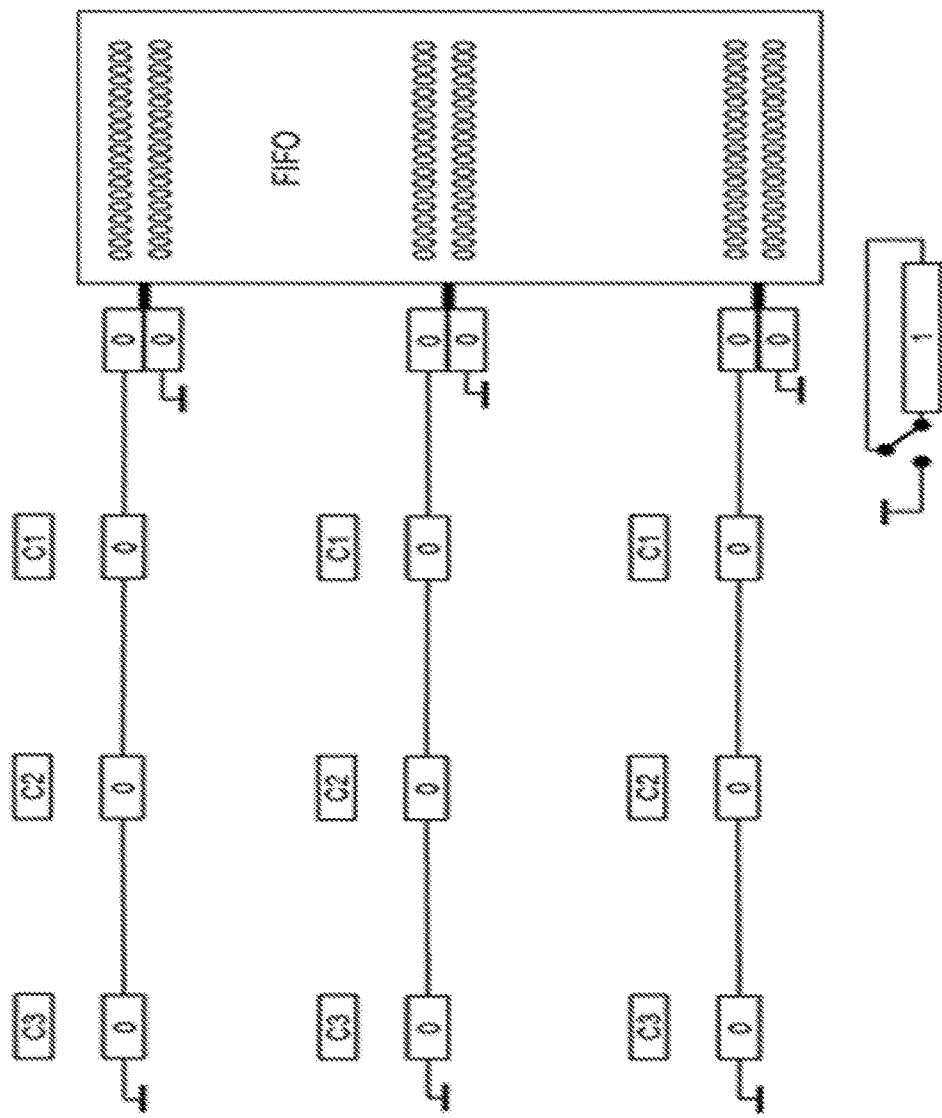
Figure 2b – Systolic Processing, time 1.

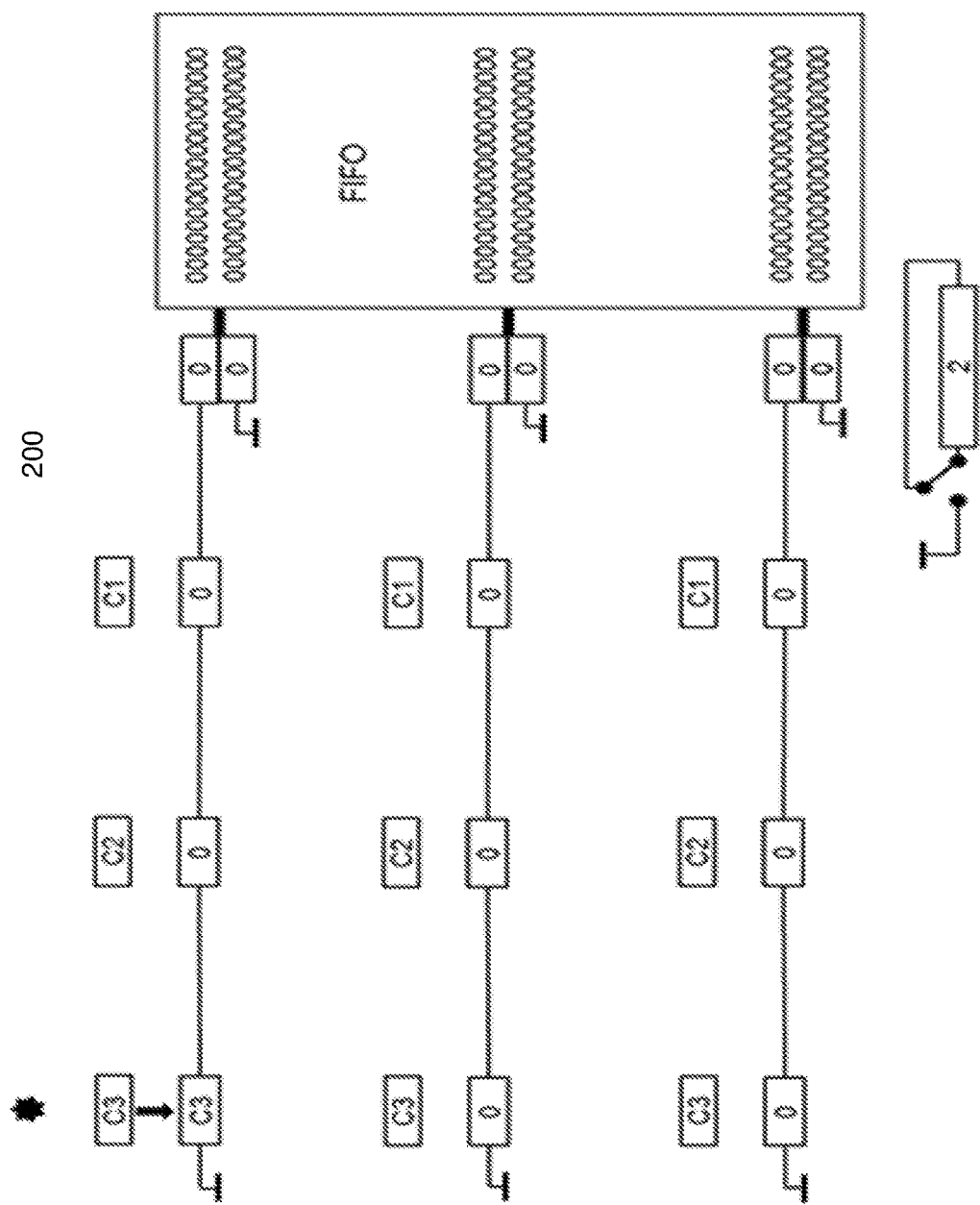
Figure 2c – Systolic Processing, time 2

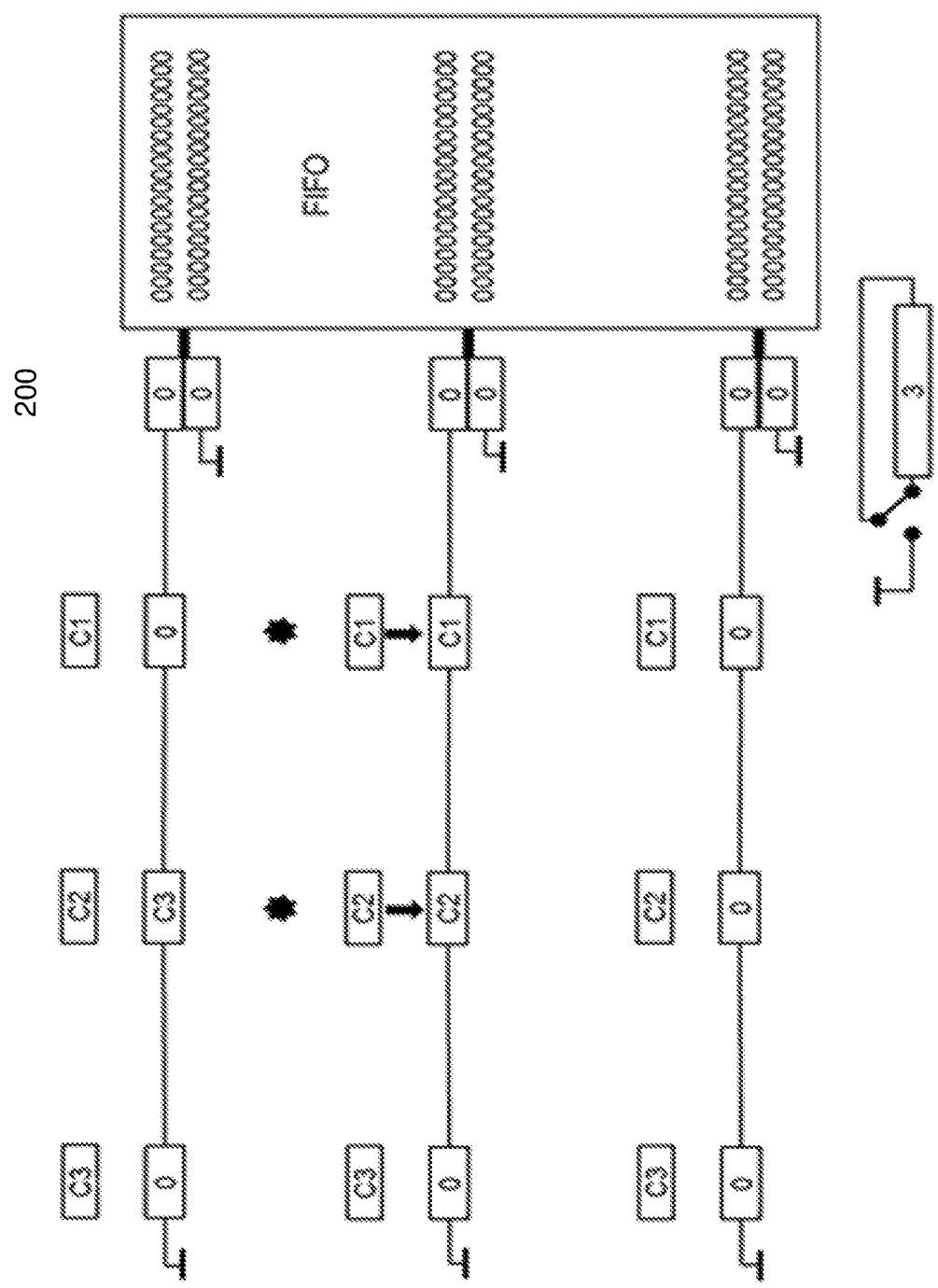
Figure 2d – Systolic Processing, time 3

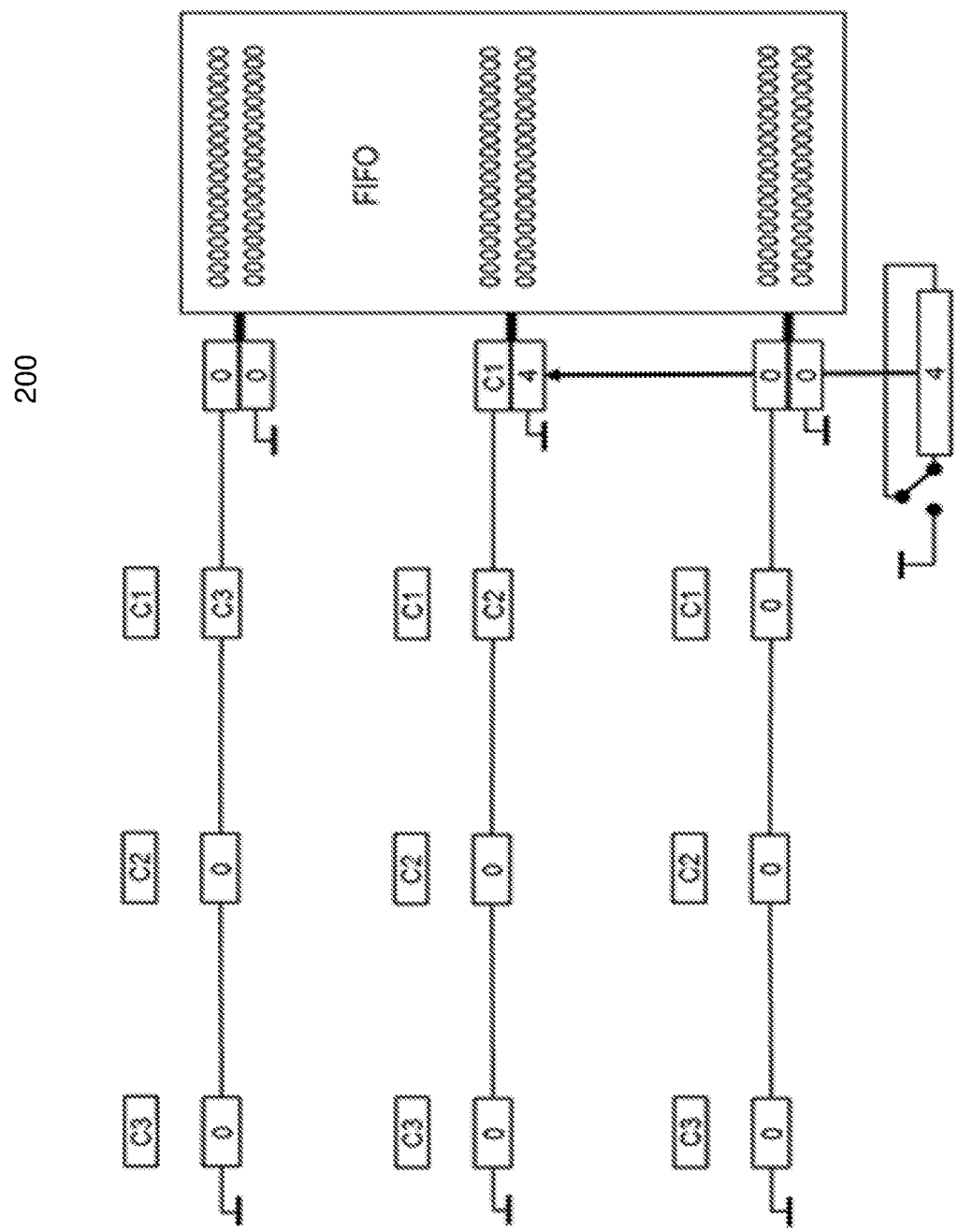
Figure 2e – Systolic Processing, time 4

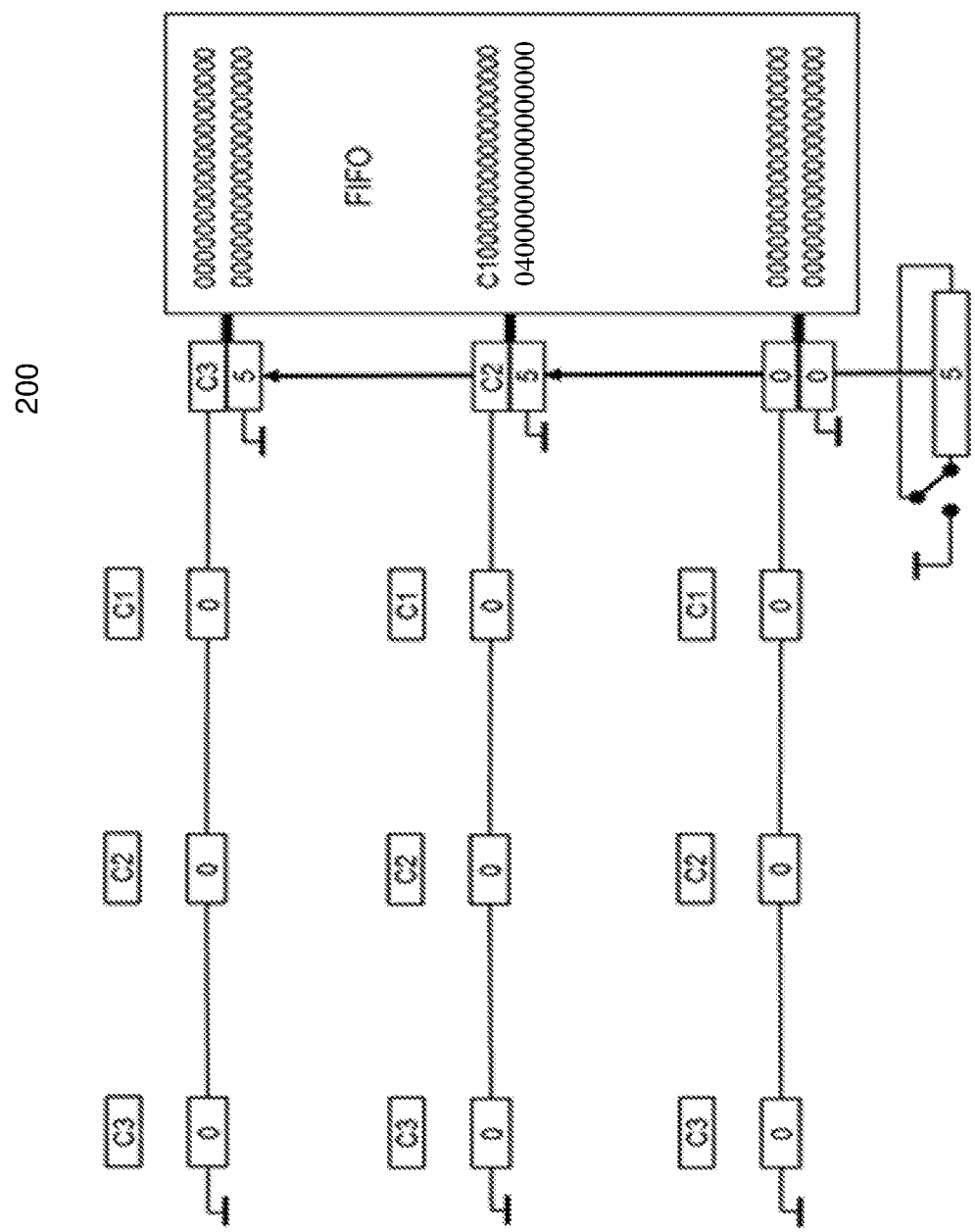
Figure 2f – Systolic Processing, time 5

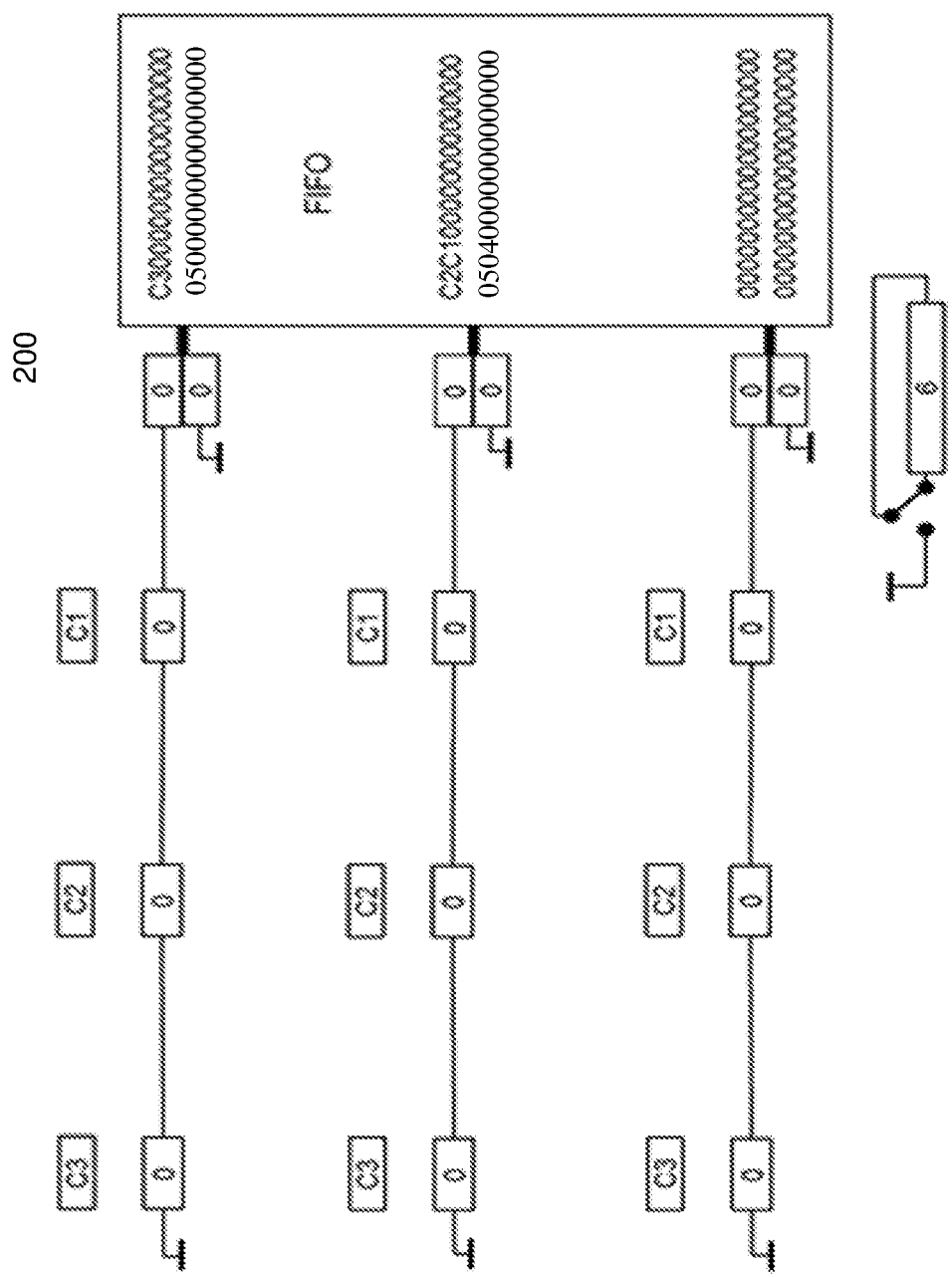
Figure 2g – Systolic Processing, time 6

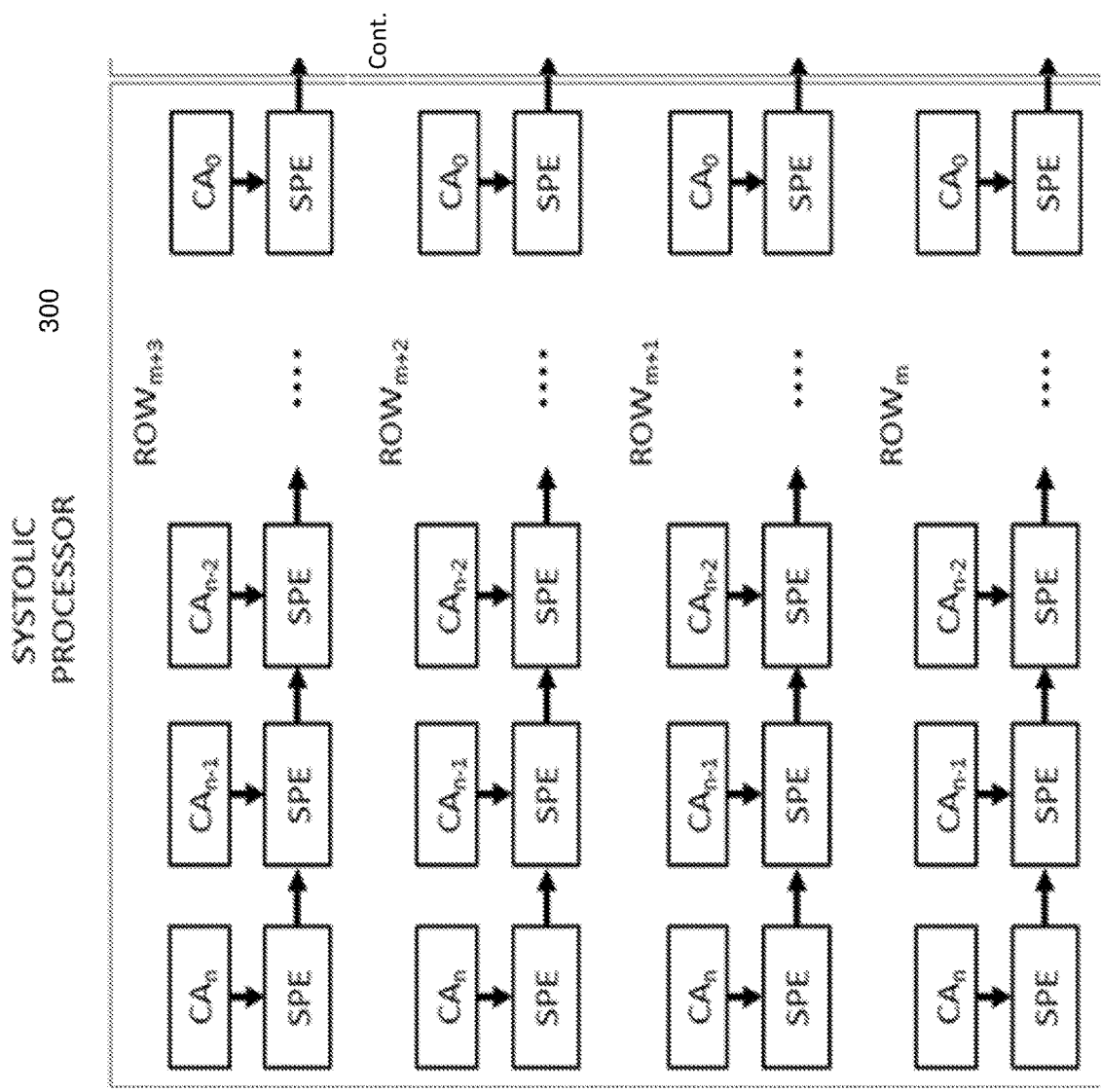
Figure 3A. The block Diagram of the Systolic Processing ROIC

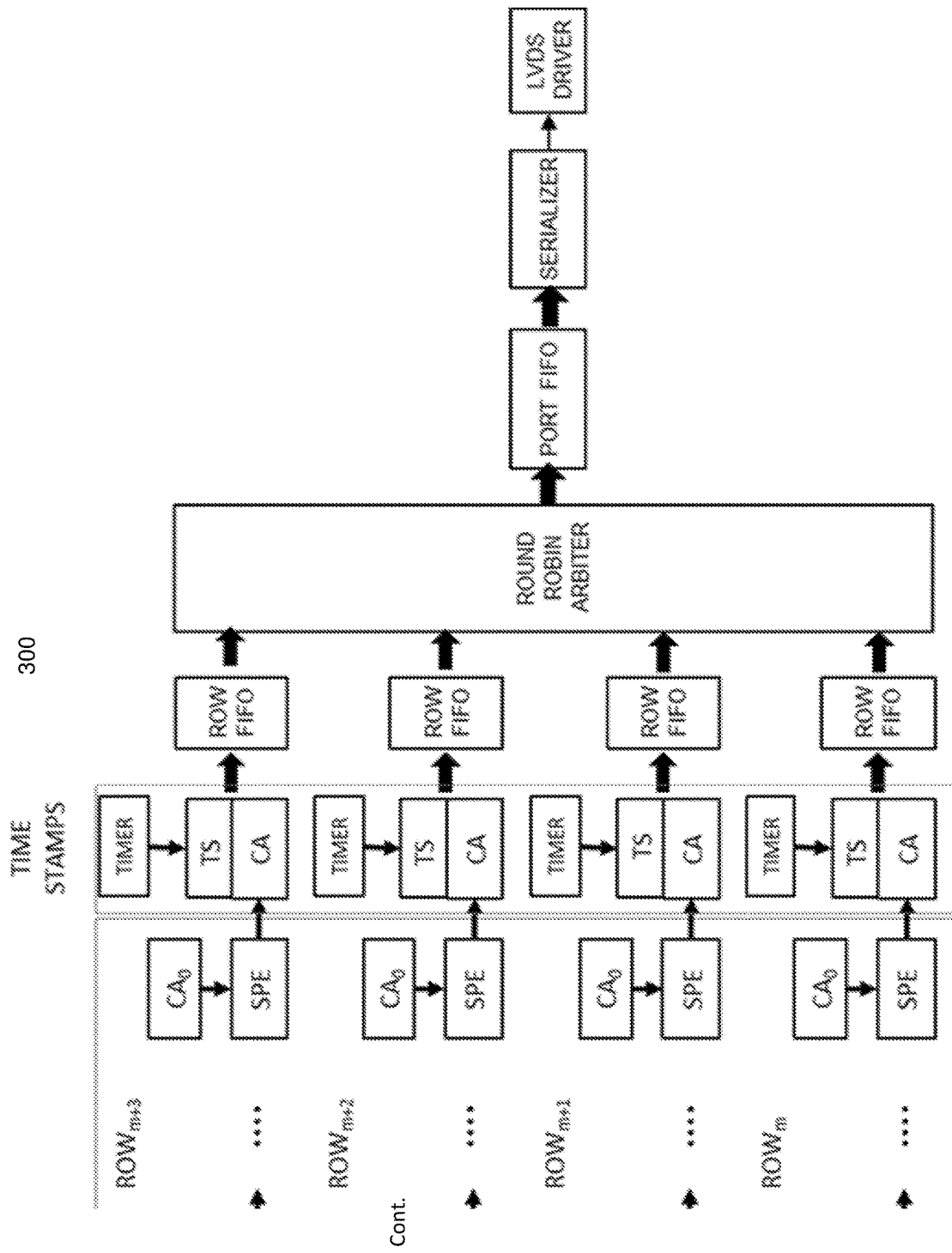
Figure 3B. The block Diagram of the Systolic Processing ROIC

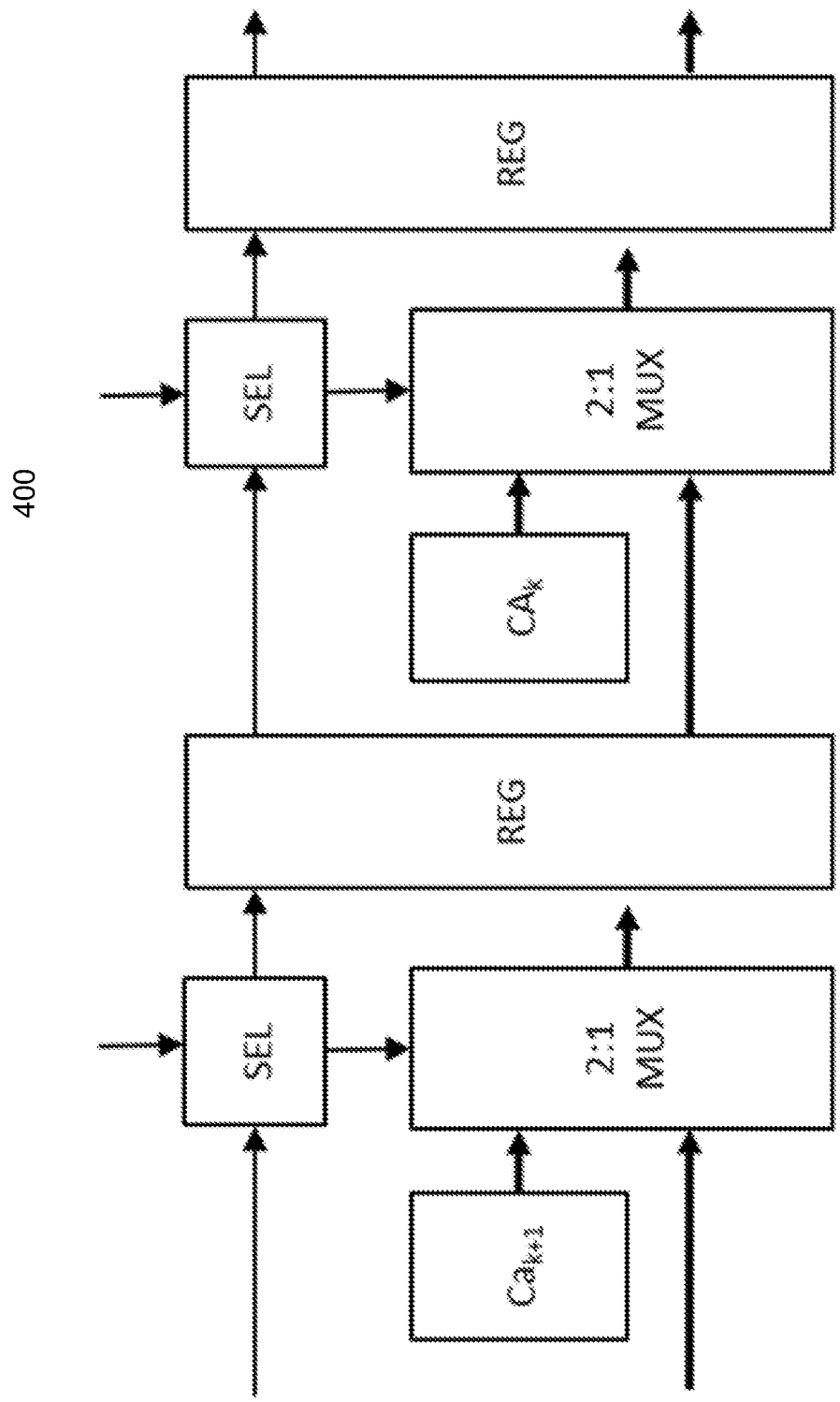
Figure 4. Detail of Systolic Processing Element.

SYSTOLIC PROCESSOR SYSTEM FOR A LIGHT RANGING SYSTEM

CROSS-REFERENCE

This application is a 35 U.S.C. § 371 U.S. National Stage of International Patent Application No. PCT/US2018/018843, titled "A SYSTOLIC PROCESSOR SYSTEM FOR A LIGHT RANGING SYSTEM" having an International Filing Date of Feb. 20, 2018 which claims priority under 35 USC 119 to U.S. provisional patent application Ser. 62/465,040, titled "SYSTOLIC PROCESSOR FOR FOCAL PLANE GEIGER MODE APD ARRAYS", Filed: 28 Feb. 2017, the disclosure of which is incorporated herein by reference in its entirety.

GOVERNMENT RIGHTS

This invention was made with Government support under contract no. HR0011-13-C-0045 awarded by the Defense Advanced Research Projects Agency. The Government has certain rights in this invention. The government has certain rights in the invention.

TECHNICAL FIELD

Embodiments of this disclosure relate generally to a systolic processor system for a light ranging system. More specifically, an embodiment relates to a systolic processor system for a LiDAR system to create a better readout with a greater resolution for time of flight measurements.

SUMMARY

Provided herein can be various methods, apparatuses, and systems for a system to measure characteristics of one or more objects with one or more light pulses.

In an embodiment, systolic processing is used for a light ranging system to create a better readout with a greater resolution for, for example, time of flight measurements. A receiver circuit includes a Read-Out Integrated Circuit (ROIC) containing one or more light detectors, such as Avalanche Photodiode (APDs), arranged in an array that cooperate with a clock circuit. The Read-Out Integrated Circuit is configured to measure at least a time of flight starting when at a first reference time and at a second reference point. Each row of the array can be made up of a plurality of light detectors and associated registers.

The ROIC performs systolic processing of the light detectors. The ROIC performs the systolic processing of the light detectors to capture at least i) when, in time units, an initial photon of its reflected light pulse is captured by each of the light detectors in the array, ii) where geographically its photon is located in the array, iii) scan out data captured by the light detectors, and then iv) analyze the scanned out data with an algorithm to know when, in terms of time units, the photon was captured relative to the input from the clock circuit in order to determine an object's characteristics, such as the measure the time of flight, with extremely precise resolution.

DRAWINGS

The drawings refer to some embodiments of the design provided herein in which:

FIG. 1 illustrates a block diagram of an embodiment of an example light ranging system to measure characteristics of one or more objects with one or more light pulses with a systolic processing Read-Out Integrated Circuit (ROIC) to create a better readout with a greater resolution for, for example, time of flight measurements.

FIGS. 2a through 2g diagrams of an embodiment of an example demonstration of systolic processing for a ROIC in asynchronous operation.

FIGS. 3A and 3B illustrate block diagrams of an embodiment of the systolic processing ROIC.

FIG. 4 illustrates a block diagram of an embodiment of portions of an example Systolic Processing Element.

Figure 1:
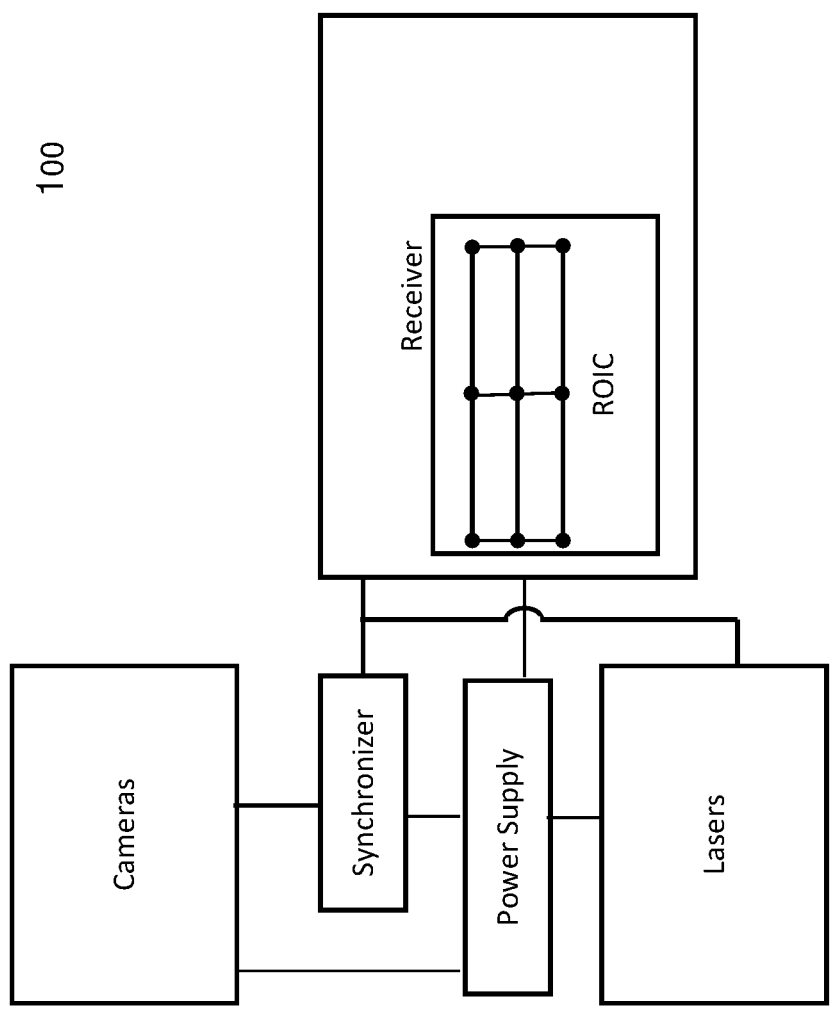

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first computing device, can be made. However, the specific numeric reference should not be interpreted as a literal sequential order but rather interpreted that the first computing device is different than a second computing device. Thus, the specific details set forth can be merely exemplary. The specific details can be varied from and still be contemplated to be within the spirit and scope of the present design. The term "coupled" is defined as meaning connected either directly to the component or indirectly to the component through another component.

In general, one or more embodiments of a light ranging system that uses a ROIC containing one or more light detectors arranged in an array that cooperate with a clock circuit are discussed. The ROIC may perform systolic processing of the light detectors. The ROIC performs the systolic processing of the light detectors to capture at least i) when, in time units, an initial photon of its reflected light pulse is captured by each of the light detectors in the array, ii) where geographically in terms of column and row address of the light detector capturing its photon is located in the array, iii) scan out data captured by the light detectors on at least the when in time units, and the where geographically that the photon was captured in a given light detector in the array, and then iv) analyze the data on the when and the where with an algorithm to know exactly when exactly, in terms of time units, the photon was captured relative to the input from the clock circuit.

Three notable points: 1) In general, in previous ROIC architectures, there was a need for the actual time information at each pixel. That means the power dissipation increases linearly with the number of pixels. Instead, in this design, two or more rows of systolic processor elements share a common timer keeping track of the time units. 2) Also, in previous ROIC architectures, the Time-Of-Flight counters need to keep time for the duration of the counting cycle and then need to keep counting indefinitely. Therefore, they occasionally overflow and higher order "time" needs to be kept outside of the ROIC or they need to be much longer, which further increases power dissipation and it increases the volume of data generated by the ROIC. 3) Also, in previous ROIC architectures, a dead time lag, such as several operational cycles, exists between capturing the detection of a photon and when that pixel can detect another photon at that location. Instead, in this design, the set of a light detector and its associated register can detect the initial photon returning from the target to that geographic location in the array, and then beginning on a very next cycle that set of light detector and its associated register be able to detect another photon returning from the target to that geographic location in the array. The systolic processing of the light detectors reduces dead time of the ROIC to record time of flight data by capturing a photon for that light detector and its associated register in the array, which leads to a greater resolution by the detection of the reflected light pulses.

FIG. 1 illustrates a block diagram of an embodiment of an example light ranging system to measure characteristics of one or more objects with one or more light pulses with a systolic processing Read-Out Integrated Circuit (ROIC) to create a better readout with a greater resolution for, for example, time of flight measurements.

The light ranging system 100, such as a LiDAR system, measures characteristics of one or more objects, such as distances by measurement of a time including a time of flight measurement, with one or more light pulses and the detected reflected photons. One or more lasers generate the one or more light pulses. One or more cameras detect photons in reflected light pulses from one or more target objects.

A receiver circuit includes a ROIC containing one or more light detectors, such as Avalanche Photodiode (APDs), arranged in an array that cooperate with a clock circuit. The ROIC is configured to measure at least a time of flight of the reflected light pulses by using an input from the clock circuit and then measure the time of flight starting at a first reference time and stopping at a second reference point. The first reference point may be the time expected for the pulse to be coming back based on the system's estimation of when that would be in order to eliminate noise, the time a laser pulse leaves the laser, or some other reference point in time. The second reference point may be when an associated light detector in the array detects a photon of the reflected light pulse, when the system has completed sampling its range, or some other reference point in time. Each row of the array can be made up of a plurality of light detectors and associated registers. Each column of the array can also be made up of a plurality of light detectors and associated registers.

The ROIC contains a plurality of systolic processor elements. Each systolic processor element has its own light detector and associated register. Each systolic processor element has two inputs i) a systolic processor element's output from its neighbor systolic processor element on the left and ii) a column address of its associated pixel in the array in order to convey a detected photon location and time of arrival information.

The ROIC performs systolic processing of the light detectors. The ROIC performs the systolic processing of the light detectors to capture at least i) when, in time units, an initial photon of its reflected light pulse is captured by each of the light detectors in the array, ii) where geographically in terms of column and row address of the light detector capturing its photon is located in the array, iii) scan out data captured by the light detectors on the when in time units, and the where geographically that the photon was captured in a given light detector in the array, and then iv) analyze the data on the when and the where with an algorithm to know exactly when exactly, in terms of time units, the photon was captured relative to the input from the clock circuit in order to determine an object's characteristics, such as the measure the time of flight, with extremely precise resolution.

Each systolic processor element may perform the systolic processing as follows:

i) in the absence of photon detection, the data proceeds from the left to the right in the array of systolic processor elements, and the array of systolic processor elements form a parallel shift register; and ii) when an event of photon detection occurs, then the column address of the activated light detector is injected into its systolic processor element and shifted serially to the right on each subsequent clock cycle until this data is stored in a common buffer for that row. The leftmost systolic processor element (at the input to the systolic processor) does not have a neighbor on its left and it is configured to pass its own column address instead.

The systolic processor element cooperating with a downstream analysis module determines an actual time of arrival of a detected photon relative to a duration of time of flight of that photon from the laser to the target and then the detection of the initial photon in the reflected wave in the pixel in the array.

One more power sources supply power to the lasers, the receiver, the clock circuit, and the cameras.

In an embodiment, LiDAR can measure distances with great precision (both in distance and spatial resolution). LiDAR measures distances by measurement of the time a light pulse needs to reach a target and return back. A LiDAR includes a laser generating short light pulses and a camera detecting reflected light pulses and measuring the time of flight of the light. Introduction of APDs can greatly improve the performance of LiDAR by its ability to detect a single photon, the first photon returning from the target, i.e. the photon with the shortest path between the target and the LiDAR rather than any photon reflected by secondary reflections.

This design may use a systolic processing technique, which removes the timers from each pixel of the planar Griger mode APD array; and thereby, significantly reduce power consumption and simplify circuitry to enable higher density arrays.

The ROIC may be used in multiple systems as discussed herein. For example, the ROIC may be used in passive listener system without a transmitter. Also, the ROIC may be used in an application like a microscope where you could determine characteristics. Microscope and devices like that have a light transmitter which will use the ROIC to get the data and do characteristics like size, chemical composition based on light coming back or object detection. Also, the ROIC array is compact. Note, the dimensions can correlate to the pitch between adjacent pixels. Also, the error can be determined by a quench circuit.

FIGS. 2a through 2g diagrams of an embodiment of an example demonstration of systolic processing for a ROIC 200 in asynchronous operation. These figures represent a sequence of successive Time-Of-Flight values for a 3×3 pixel tile. In the figures, the first rectangle with the 'C' shows a light detector at that column and row address and the second rectangle is its associated register storing a value. The associated registers have numbers in them, which can represent the column address location. For ease of comparison, these rectangles may correspond to the example ones depicted in FIGS. 3A and 3B. Notice that in these figures, there is only one Time-Of-Flight counter at the bottom near the left edge of the FIFO buffer, the rectangle with feedback switch. Thus, the two or more rows of systolic processor elements may share a common timer keeping track of the time units.

The term "systolic processing" can be used to describe a class of computer architectures that includes an array of nearby neighbors of connected simple processors. The data flows through these processors in pipeline mode at a fixed rate. The term "systolic processing" is used here because it fittingly describes an example structure and processing in the ROIC for control of an array of light detectors and associated registers. Systolic processing in this context has several beneficial features:

The delay between photon arrival at each column and its exit from the systolic processor is a multiple of the clock cycles.

If the systolic processing proceeds from left to right and the delay of each Systolic Processing Element (SPE) is one clock cycle and if the columns can be numbered from right to left, the algorithm may determine the photon's time arrival as the time of its exit from the systolic processor minus the column number.

There is no need for the time information to be electronically supplied at every pixel (APD location). The time information merely needs to be tracked at the exit from the systolic processor.

For square arrays the size of the SPE grows with $\log_2(n)$, where n is the number of columns, e.g. each doubling of the number of columns in the array adds one bit to the width of the SPE while in the synchronous or asynchronous mode, each pixel has a fixed width equivalent to the length of the Time-Of-Flight counter (usually 10 or more bits). Again, the ROIC array is compact.

The light detectors and associated registers capture data indicative of when the photon of the reflected pulse is detected and where geographically in the array the photon was collected. Thus, the data reflects a detected photon's arrival time and position in the array. On each cycle, the data shifts from the light detector and associated register serially through a row of the array to a buffer, which then sends the captured data into its own column address decoder and time stamp decoder that use the algorithm to decode when exactly, in terms of time units, the photon was captured in the array relative to the input from the clock circuit and where geographically the photon was captured.

FIG. 2a starts from a Time-Of-Flight value of 0. FIG. 2a shows the systolic processing at time 0. FIGS. 2b and 2c show the next two cycles. FIG. 2b shows the systolic processing at time 1. No photon is detected. FIG. 2c shows the systolic processing at time 2. A first photon arrives in the left uppermost SPE (designated by the little star). Again, in FIG. 2c a photon arrives in the left uppermost pixel (C3) and the value of its column address (C3) is loaded into the systolic processor. Notice that this photon arrived at Time-Of-Flight equal to 2 time units. FIG. 2d shows the systolic processing at time 3. Two more photons arrive in columns C2 and C1 in the second row of the array. Also, the data for the first photon moves through the systolic processor one step to the right. Thus, two more photons arrive and their respective column addresses get loaded into the register of the systolic processor. During the same time, the column address of the previous photon shifts one step to the right through the systolic processing pipeline. Notice that these two photons arrived at a Time-Of-Flight equal to 3 time units. FIG. 2e shows the systolic processing at time 4. Data representing a photon leaves the systolic processor and it is appended with present value of the Time-Of-Flight counter: C1-4. Thus, the systolic processor moves its content one step to the right. This forces the right-most photon column address out of the systolic processor at which point the column address gets appended by the present Time-Of-Flight value. This process can be referred to as being "time stamped". FIG. 2f shows the systolic processing at time 5. Data representing two more photons leaves the systolic processor and are "time stamped": C3-5 & C2-5. Also, the data for the other detected photon, C1-4, enters the FIFO buffer. Thus, the remaining two photons can be time stamped and the previously time stamped photon is written to the FIFO buffer. FIG. 2g shows the systolic processing at time 6. The data for all three photons is written into the FIFO buffer. Thus, in FIG. 2g the last two photons can be written to the FIFO buffer.

Now the different decoder modules can examine the content of the FIFO. In the top row the system has a record that a photon from row 1 column address 3 exited the systolic processor at time 5. In the row below, row 2, the system has records of two photons. One record from row 2, column 1 exited at time 4. A second record from row 2, column 2 exited at time 5. The algorithm may calculate the actual time of photon arrival as: 5−3=2 (time units) for the first arriving photon in row one, and 4−1=3 (time units) and 5−2=3 (time units) for the other two photons from row 2.

Each light detector in the rows and columns making up the array has the ability to detect a single photon; and thus, detect the first/initial photon returning from the target to that geographic location in the array; rather than, detect any photon reflected by secondary reflections. Also, beginning on a very next cycle, that set of light detector and associated register is able to detect another photon returning from the target to that geographic location in the array. The systolic processing of the light detectors reduces dead time of the ROIC to record time of flight data by capturing a photon for that pixel in the array of pixels, which leads to a greater resolution/improved measurement by the detection of the reflected light pulses.

Three notable points: 1) In this design, two or more rows of systolic processor elements share a common timer keeping track of the time units. 2) In previous ROIC architectures, the Time-Of-Flight counters need to keep time for the duration of the counting cycle and then may need to keep counting indefinitely. Therefore, they occasionally overflow and higher order "time" needs to be kept outside of the ROIC or they need to be much longer, which increases power dissipation and it increases the volume of data generated by the ROIC. 3) Also, in previous ROIC architectures a dead time lag, such as several operational cycles, exists between capturing the detection of photon and when that pixel can detect another photon at that location. Instead, in this design, the set of a light detector and its associated register can detect the initial photon returning from the target to that geographic location in the array, and then beginning on a very next cycle that set of light detector and its associated register is able to detect another photon returning from the target to that geographic location in the array.

FIGS. 3A and 3B illustrate of an embodiment of the systolic processing ROIC. The components of the systolic processing ROIC from FIG. 3A continue on into FIG. 3B. The system 300 includes the Systolic Processor including its Systolic Processing Elements (SPEs), the Time Stamp blocks (TS), the Row FIFOs, the Round Robin Arbiter, the Port FIFO, the Serializer, and the LVDS Driver. A skilled FPGA architect may replace these blocks with multiport generic SRAM and corresponding algorithms for its management.

The Systolic Processing Elements

Each pixel (light detector location) has one SPE associated with it and every row of connected SPEs corresponds to one row of pixels. Each SPE has two inputs: an SPE output from its neighbor on the left and a column address of its associated pixel. The leftmost SPE (at the input to the systolic processor) does not have a neighbor on its left and it is configured to pass its own column address instead. In the absence of photon detection, the information proceeds from the left to the right and the chain of SPEs forms a parallel shift register. In the event of photon detection, the column address of the activated pixel is injected into its SPE and shifted to the right on the next clock cycle.

A first time stamp block for a first row, a second time stamp block for a second row, etc., in the array all receive, a common time reference input from the clock circuit. Each time stamp block consists of a time counter (TIMER) and associated shadow timer register with content referred to as time stamp (TS). Each time stamp block cooperates with a pipeline column address register (CA). Where as a data flow of tagged column addresses passes through the time stamp block, a momentary value of the time counter is appended to a column address from the column address register to indicate the location and the arrival time the detected photons. Each time stamp decoder receives a common time reference input from the clock circuit.

Systolic processor formed by a series of chains with above described SPEs produces constant flow of column addresses with photon tags indicating that the address reflects detection of a photon. This flow is presented to the time stamp decoder block.

The Time Stamps

The Time Stamp blocks (refer to FIG. 3B) each include a time counter (TIMER), shadow timer register with content referred to as Time Stamp (TS) and a pipeline column address register (CA). As the flow of tagged column addresses passes through the Time Stamp block, the momentary value of the TIMER is appended to the column address (the column address is Time Stamped). Because both the location and the arrival time need to be known, the result is passed along with the photon tags.

The timing capacity of the TIMER is limited by its width. In the present configuration, the TIMER width is, for example, ten (10) bits. For longer exposure times, the TIMER will periodically overflow. The time stamps block monitors the TIMER overflows and replaces the entire content of the TS and CA with unique bit combination indicating the TIMER overflow to the logic following blocks.

Note: the above described systolic processing principle and concept is fully capable of generating and maintaining detected photon location and time of arrival information. However, there may be instances where the maximum clock speed sustainable by the chosen IC process does not offer sufficient time resolution. In such instances the phase shifting method described herein can be utilized. The clock circuit has at least two clock signals generated at a same frequency that are shifted by 90 degrees with respect to each other and are distributed to each pixel in the array. These clock signals are tracked by two or more latches at every pixel. At an onset of a detection of a photon's arrival, the two latches are switched to latched mode capturing the momentary state of the two clock signals. Note, because the at least two clock signals are 90 degree shifted clocks, they result in at least four binary combinations within each cycle corresponding to one clock cycle. A time stamp block is configured to discriminate the photon arrival time to within a quadrant of one clock cycle; and thus, increasing a time resolution by at least four times the frequency of the clock signals.

In this example a clock of 1 GHz is used, however, the desired resolution is 250 ps. To achieve this, two 1 GHz clocks shifted by 90 degrees with respect to each other can be distributed to each pixel. These clocks can be tracked by two latches at every pixel. At the onset of photon arrival detection, these two latches can be switched to latched mode capturing the momentary state of the two clocks. Because the two 90 degree shifted clocks result in four binary combinations within each 1 nanosecond cycle, the photon arrival time can be further discriminated to within a quadrant of the 1 nanosecond cycle. The latched state of these two bits is appended to the column address in the systolic processor and to the Time Stamp in the Time Stamps block. Notice that identical result would be obtained without the two 90 degree shifted clocks and without any latches at each pixel if the IC process could support clock frequency of 4 GHz and the width of the TIMER block was increased by two bits.

The Row FIFO

In an example, the maximum number of output LVDS ports combines four Time Stamp output channels (pixel rows) into one port. To accommodate peak momentary throughput demands there is relatively shallow FIFO at the output of each row. Modelling with uniform and Gaussian distribution of light reveals that a depth of four (4) words is sufficient. The ROW FIFO begins to overflow only at light intensities when the capacity of the SERIALIZER begins to limit the data outflow. Increasing the depth of the ROW FIFO in such case does not increase the capacity of the channel, it only delays when the overflow begins.

In the case of an overflow, the ROW FIFO preserves its content and simply discards the excess photon timestamps. Notable exception is TIMER overflow indicator which can't be discarded and therefore, if needed, it overwrites the top of the ROW FIFO.

The Round Robin Arbiter

In an embodiment, the reads from the ROW FIFOs can be controlled by the ROUND ROBIN ARBITER. The ROUND ROBIN ARBITER monitors read requests from the four ROW FIFOs and FIFO full indicator from the PORT FIFO. The ROUND ROBIN ARBITER includes a simple sequencer which, based on its present state, arbitrates between the four ROW FIFOs. In the case that the PORT FIFO is not full and all four ROW FIFOs requesting a read, the arbiter satisfies these requests in a round robin sequence (hence the name ROUND ROBIN ARBITER). If not all four ROW FIFOs request reads the round robin sequence is abbreviated, i.e. the empty ROW FIFOs can be skipped to take full advantage of the PORT FIFO input capacity. Ultimately, if only one ROW FIFO has content, it will be transferred to the PORT FIFO at one transfer per one clock cycle rate. Because the ROUND ROBIN ARBITER knows which ROW FIFO is being serviced, it appends the ROW FIFO content with additional two bits indicating the row address. Therefore, at the input of the PORT FIFO, each photon arrival event is identified by its Time Stamp, Column Address and Row Address.

The Port FIFO

The function of the PORT FIFO is to speed match the momentary peak throughput demands of the systolic processor with the maximum transfer capacity of the serial LVDS port. The same modelling used for ROW FIFO suggests that PORT FIFO depth of sixteen (16) words satisfies peak demands in over 98% of cases with random photon arrival rate as long as the aggregate photon arrival rate is below the capacity of the serial port. If the aggregate photon arrival rate exceeds the serial port capacity, the PORT FIFO will eventually overflow regardless of its depth and draining it will take excessive amount of time.

The PORT FIFO is basic FIFO structure because no overflow can happen. The ROUND ROBIN ARBITER simply stops writing into full PORT FIFO and pushes the overflow problem to the ROW FIFOs.

The reads from the PORT FIFO can be controlled by the SERIALIZER. The serializer fetches fresh content from the PORT FIFO at the end of previous character. Should the serializer need fresh character at the time the PORT FIFO is empty, it generates an IDLE CHARACTER—unique string of ones and zeroes which can't happen with valid photon arrival characters—keeping the receiver locked and ready for the next valid data.

FIG. 4 illustrates a block diagram of an embodiment of example portions of a Systolic Processing Element. Each systolic processor element further includes i) a multiplexor or an equivalent Boolean logic gate at its input, ii) a generator of a local column address ($CA_{xx}$), and iii) a multiplexor input selector logic (SEL) in order to serially shift the data through the array reflecting the detected photon arrival and its column and row address.

In detail, see FIG. 4 depicting two adjacent SPEs 400. The Systolic Processing Element includes a register (REG) with 2:1 multiplexor (2:1 MUX) at its input, generator of local column address ($CA_{xx}$) and multiplexor input selector logic (SEL). The width of the REG depends on the length of the systolic processor chain. In this configuration the number of pixels processed by each systolic processor chain is sixteen (16), therefore the width of the REG is four bits ($\log_2 16=4$). Further, there is additional bit (shown on top of FIG. 4) indicating whether or not the address content of the REG reflects detected photon arrival (a photon tag). The 2:1 MUX passes through either the content of the REG from its neighbor on the left or the column address of its own pixel. The CAxx column address generator can be hardwired (combination of VSS and VDD ties) further saving power. The SEL block monitors photon tags from its left neighbor and from its own pixel. The default SEL output selects the neighbor's content regardless of the neighbor's photon tag. Only when its own pixel detects a photon the SEL injects its CAxx for one cycle. Obviously, there can be conflicting demand when both the neighbor and its own pixel claim access to the REG during the same clock cycle. In this configuration, priority is given to the neighbor to favor the pixels from the center of the imager at the expense of the periphery.

In an embodiment, the light detectors are planar Geiger mode Avalanche Photodiode (APD) arrays, and the ROICs are configured to contain an array of APDs, as the light detectors, and circuitry to control the Geiger mode operation, and a first set of APDs and its associated register has a bypass circuit to bypass this APD and associated register so that the data can serially shift through, a defective set of APD and associated register, in a given row of the array.

Applications

Both synchronous and asynchronous Geiger mode APD planar arrays can be used in LIDARs for aerial and ground-based 3-D imaging, for ranging, mapping, collision avoidance, targeting etc. Advantages of 3-D imaging have been demonstrated for example in detection of objects hidden under dense tropical foliage. More recently, early experience with autonomous vehicles using public roads suggests that LIDAR will be necessary to augment the capabilities of other sensors, such as 360° RADAR, passive video cameras, etc.

Heat dissipation and circuit complexity can be limiting to the maximum size and minimum pixel pitch of existing planar APD arrays operated in Geiger mode. This limit is the result of existing ROIC architectures requiring Time-of-Flight information at every pixel. The reported state of art arrays today can be 256×64 pixels in size with pixel pitch of 50 um and the Time-Of-Flight measurement limited to 1-2 microseconds. The power consumption limits the duration of mission while the pixel pitch mandates use of large lenses increasing weight of the camera and cost. Broader industrial deployment of this technology in the future depends on reductions of power consumption combined with decreased pixel pitch and increased spacial resolution (higher pixel count).

List of Abbreviations

APD—Avalanche Photodiode: A photodiode designed to take advantage of avalanche multiplication of photocurrent. As the reverse-bias voltage approaches the breakdown voltage, hole-electron pairs created by absorbed photon accelerate by the strong electric field to acquire sufficient energy to create additional hole-electron pairs when they collide with ions; thus multiplying the generated current.

Geiger mode—APDs can be operated in two modes: linear and Geiger mode. In linear mode the APD bias is not sufficient to trigger an avalanche, and the APD operates with a gain (usually between 1 and 5). In Geiger mode the APD bias is nimbly controlled between levels sufficient to trigger an avalanche and levels quenching it. In this mode the APD exhibits photocurrent gains between 100 and 1000.

ROIC—Read-Out Integrated Circuit: Integrated circuit utilizing standard foundry CMOS process providing in-pixel digitization and digital readout. ROICs can be hybridized to an array of photodiodes (type of photodiode varies) and in cases of APDs they include circuitry to control the Geiger mode operation.

LiDAR—Light imaging, Detection And Ranging: Measures distances by illuminating the target with laser light impulse and measuring the time of flight of the returned (reflected) light. It is used to make high resolution 3-D maps, in geology, agriculture, archaeology, meteorology, physics and astronomy, military and more recently by automobile industry in autonomous vehicles.

Figure 5:
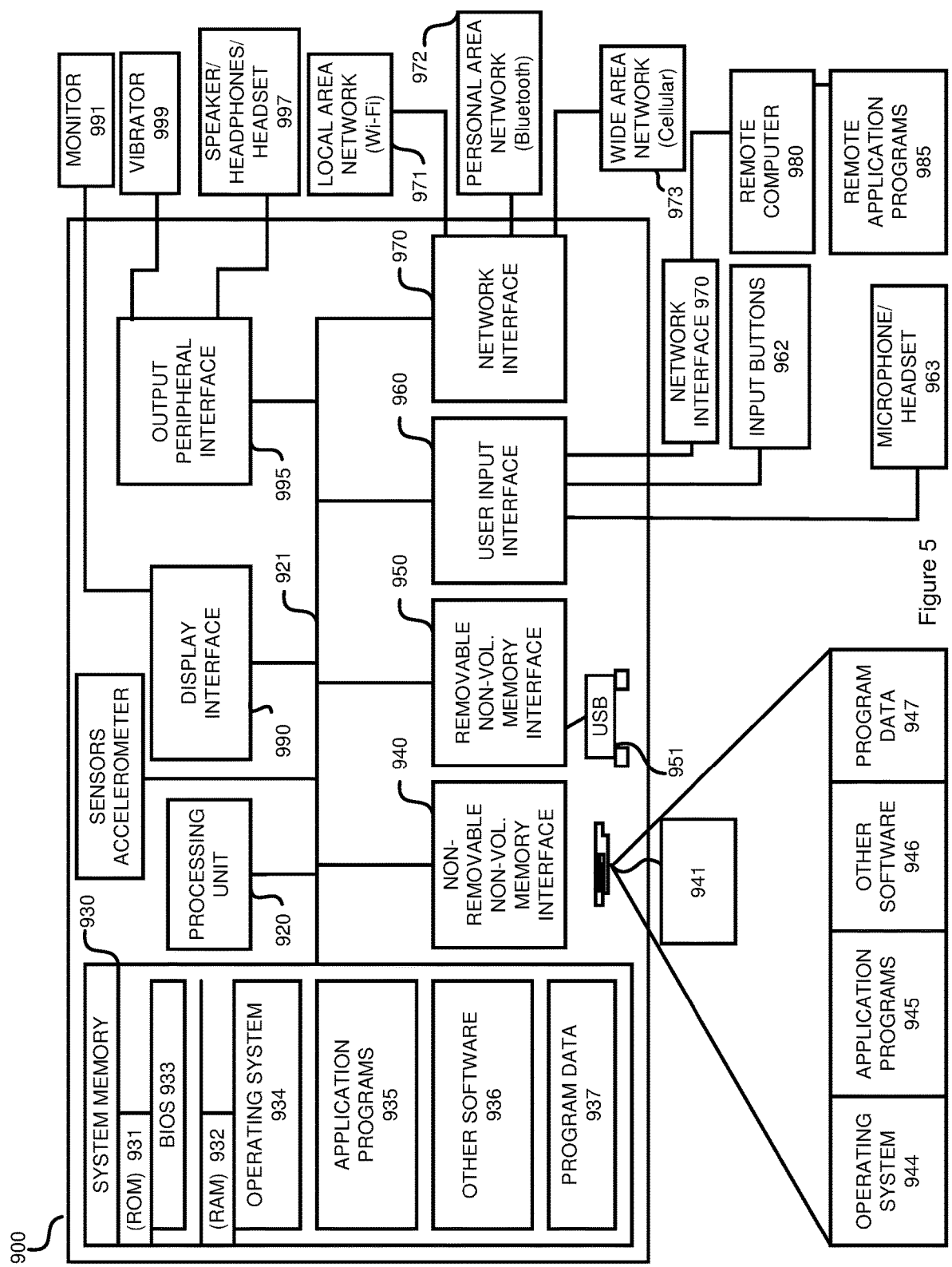
FIG. 5 illustrates an embodiment of one or more computing devices that can be a part of the systolic processor system for a light ranging system.

FIG. 5 illustrates an embodiment of one or more computing devices 900 that can be a part of the systolic processor system for a light ranging system. The computing device may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections depicted in FIG. 5 can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resident on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to FIG. 5. However, the present design can be carried out on a server, a computing device devoted to message handling, or on a distributed system in which different portions of the present design are carried out on different parts of the distributed computing system.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in portion of a memory and is executed by one or more processors.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A system to measure the presence of one or more objects with one or more light pulses, comprising:
   one or more lasers configured to generate the one or more light pulses;
   one or more cameras configured to detect reflected light pulses from the one or more target objects;
   a receiver circuit that includes a Read-Out Integrated Circuit (ROIC) containing one or more light detectors, arranged in an array, that cooperate with a clock circuit, where the ROIC is configured to measure at least a time of flight of the reflected light pulses by using an input from the clock circuit and then measure the time of flight starting at a first reference time and stopping at a second reference point, where the ROIC is configured to perform systolic processing of the light detectors, where the ROIC performs the systolic processing of the light detectors to capture at least i) when, in time units, an initial photon of its reflected light pulse is captured by each of the light detectors in the array, ii) where geographically its photon is located in the array, iii) scan out data captured by the light detectors, and then iv) analyze the scanned out data with an algorithm to know when, in terms of time units, the photon was captured relative to the input from the clock circuit; and
   one more power sources configured to supply power to the lasers, the receiver, the clock circuit, and the cameras.

2. The apparatus of claim 1, wherein the light detectors and associated registers are configured to capture data indicative of when the photon of the reflected pulse is detected and where geographically in the array the photon was collected, where the light detectors and associated registers in the array are configured to shift their data on each cycle serially through a row of the array to a buffer, which then sends the captured data into its own column address decoder and time stamp decoder, where the shifting is time synchronized with the timing circuit that use the algorithm to decode when, in terms of time units, the photon was captured in the array relative to the input from the clock circuit and where geographically the photon was captured, where each time stamp decoder receives a common time reference input from the clock circuit.

3. The apparatus of claim 1, wherein the system is a LiDAR system, and each row of the array is made up of a plurality of light detectors and associated registers and each column of the array is also made up of a plurality of light detectors and associated registers.

4. The apparatus of claim 3, wherein the ROIC contains a plurality of systolic processor elements, each systolic processor element has its own light detector and associated register, each systolic processor element has two inputs: i) a systolic processor element's output from its neighbor systolic processor element on the left and ii) a column address of its associated pixel in the array in order to convey a detected photon location and time of arrival information.

5. The apparatus of claim 4, wherein each systolic processor element also further includes i) a multiplexor or an equivalent Boolean logic gate, at its input, ii) a generator of a local column address, and iii) a multiplexor input selector logic in order to serially shift the data through the array reflecting the detected photon arrival and its column and row address.

6. The apparatus of claim 1, wherein a first time stamp block for a first row and a second time stamp block for a second row in the array both receive, a common time reference input from the clock circuit, where each time stamp block consists of a time counter and associated shadow timer register with content referred to as time stamp, and cooperates with a pipeline column address register, where as a data flow of tagged column addresses passes through the time stamp block, a momentary value of the time counter is appended to a column address from the pipeline column address register to indicate the location and the arrival time the detected photons.

7. The apparatus of claim 1, wherein the light detectors are planar Geiger mode Avalanche Photodiode (APD) arrays, and the ROICs are configured to contain an array of APDs, as the light detectors, and circuitry to control the Geiger mode operation, and a first set of APDs and its associated register has a bypass circuit to bypass this APD and associated register so that the data can serially shift through a defective set of APD and associated register in a given row of the array.

8. The apparatus of claim 1, wherein the ROIC contains a plurality of systolic processor elements, each systolic processor element has its own light detector and associated register, wherein each systolic processor element is configured to perform the systolic processing as follows, i) in the absence of photon detection, the data proceeds from the left to the right in the array of systolic processor elements in a form of a parallel shift register; and ii) when an event of photon detection occurs, then the column address of the activated light detector is injected into its systolic processor element and shifted serially to the right on each subsequent clock cycle until this data is stored in a common buffer for that row; and where two or more rows of systolic processor elements share a common timer keeping track of the time units.

9. The apparatus of claim 2, wherein the systolic processing of the light detectors reduces dead time of the ROIC to record time of flight data by capturing a photon for that light detector and its associated register in the array, which leads to a greater resolution by the detection of the reflected light pulses.

10. A method to use a system to measure characteristics of one or more objects with one or more light pulses, comprising:

generating the one or more light pulses;

detecting reflected light pulses from the one or more target objects; and using a receiver circuit that includes a Read-Out Integrated Circuit (ROIC) containing one or more light detectors arranged in an array that cooperate with a clock circuit, where the ROIC is configured to measure at least a time of flight of the reflected light pulses by using an input from the clock circuit and then measure the time of flight starting at a first reference time and stopping at a second reference point, where the ROIC is configured to perform systolic processing of the light detectors, where the ROIC performs the systolic processing of the light detectors to capture at least i) when, in time units, an initial photon of its reflected light pulse is captured by each of the light detectors in the array, ii) where geographically its photon is located in the array, iii) scan out data captured by the light detectors on the when in time units, and the where geographically that the photon was captured in a given light detector in the array, and then iv) analyze the scanned out data with an algorithm to know when, in terms of time units, the photon was captured relative to the input from the clock circuit.

11. The method of claim 10, further comprising:

capturing data indicative of when the photon of the reflected pulse is detected and where geographically in the array the photon was collected, where the data shifts on each cycle through the light detectors and associated registers serially through a row of the array to a buffer, which then sends the captured data into its own column address decoder and time stamp decoder that use the algorithm to decode when, in terms of time units, the photon was captured in the array relative to the input from the clock circuit and where geographically the photon was captured.

12. The method of claim 10, wherein the system is a LiDAR system, and each row of the array is made up of a plurality of light detectors and associated registers and each column of the array is also made up of a plurality of light detectors and associated registers.

13. The method of claim 12, wherein the ROIC contains a plurality of systolic processor elements, each systolic processor element has its own light detector and associated register, each systolic processor element has two inputs i) a systolic processor element's output from its neighbor systolic processor element on the left and ii) a column address of its associated pixel in the array in order to convey a detected photon location and time of arrival information.

14. The method of claim 10, further comprising:

supplying a first time stamp block for a first row and a second time stamp block for a second row in the array with a common time reference input from the clock circuit, where each time stamp block consists of a time counter and associated shadow timer register with content referred to as time stamp, and cooperates with a pipeline column address register, where as a data flow of tagged column addresses passes through the time stamp block, a momentary value of the time counter is appended to a column address to indicate the location and the arrival time the detected photons.

15. The method of claim 10, further comprising:

using the clock circuit that has at least two clock signals generated at a same frequency that are shifted by 90 degrees with respect to each other and are distributed to each pixel in the array, where these clock signals are tracked by two latches at every pixel, where at an onset of a detection of a photon's arrival, these two latches are switched to latched mode capturing the momentary state of the two clock signals, where because the at least two clock signals are 90 degree shifted clocks, they result in at least four binary combinations within each cycle corresponding to one clock cycle, where a time stamp block is configured to discriminate the photon arrival time to within a quadrant of one clock cycle; and thus, increasing a time resolution by at least four times the frequency of the clock signals.

16. The method of claim 10, wherein the light detectors are planar Geiger mode Avalanche Photodiode (APD) arrays, and the ROICs are configured to contain an array of APDs, as the light detectors, and circuitry to control the Geiger mode operation, and a first set of APDs and its associated register has a bypass circuit to bypass this APD and associated register so that the data can serially shift through, a defective set of APD and associated register, in a given row of the array.

17. The method of claim 10, wherein the ROIC contains a plurality of systolic processor elements, each systolic processor element has its own light detector and associated register, wherein each systolic processor element is configured to perform the systolic processing as follows, i) in the absence of photon detection, the data proceeds from the left to the right in the array of systolic processor elements in a form of a parallel shift register; and ii) when an event of photon detection occurs, then the column address of the activated light detector is injected into its systolic processor element and shifted serially to the right on each subsequent clock cycle until this data is stored in a common buffer for that row; and where two or more rows of systolic processor elements share a common timer keeping track of the time units.

18. An apparatus, comprising:
a Read-Out Integrated Circuit (ROIC) containing one or more light detectors, arranged in an array, that cooperate with a clock circuit, where the ROIC is configured to measure at least a time of flight of the reflected light pulses by using an input from the clock circuit and then measure the time of flight starting at a first reference time and stopping at a second reference point, where the ROIC is configured to perform systolic processing of the light detectors, where the ROIC performs the systolic processing of the light detectors to capture at least i) when, in time units, an initial photon of its reflected light pulse is captured by each of the light detectors in the array, ii) where geographically its photon is located in the array, iii) scan out data captured by the light detectors, and then iv) analyze the scanned out data with an algorithm to know when, in terms of time units, the photon was captured relative to the input from the clock circuit.

19. The apparatus of claim 18, wherein the ROIC contains a plurality of systolic processor elements, each systolic processor element has its own light detector and associated register, each systolic processor element has two inputs: i) a systolic processor element's output from its neighbor systolic processor element on the left and ii) a column address of its associated pixel in the array in order to convey a detected photon location and time of arrival information.

20. The apparatus of claim 18, wherein the ROIC contains a plurality of systolic processor elements, each systolic processor element has its own light detector and associated register, wherein each systolic processor element is configured to perform the systolic processing as follows, i) in the absence of photon detection, the data proceeds from the left to the right in the array of systolic processor elements in a form of a parallel shift register; and ii) when an event of photon detection occurs, then the column address of the activated light detector is injected into its systolic processor element and shifted serially to the right on each subsequent clock cycle until this data is stored in a common buffer for that row; and where two or more rows of systolic processor elements share a common timer keeping track of the time units.

* * * * *